(12) United States Patent
Kegan, Sr.

(10) Patent No.: US 6,203,081 B1
(45) Date of Patent: Mar. 20, 2001

(54) EASY LIFT LEVERED SHOVEL

(76) Inventor: Edward B. Kegan, Sr., 2920 Alverta Ave., Baltimore, MD (US) 21234

( * ) Notice: Subject to any disclaimer, the term of this patent is extended or adjusted under 35 U.S.C. 154(b) by 0 days.

(21) Appl. No.: 09/526,864

(22) Filed: Mar. 16, 2000

(51) Int. Cl.[7] .................................................. A01B 1/02
(52) U.S. Cl. ........................... 294/59; 254/131.5; 294/58
(58) Field of Search ............................. 294/49, 54.5, 58, 294/59; 254/131.5, 132; 37/265, 285

(56) References Cited

U.S. PATENT DOCUMENTS

| | | | |
|---|---|---|---|
| 462,918 | * | 11/1891 | Zabel ........................................ 294/59 |
| 2,269,119 | * | 1/1942 | Mason .................................. 254/131.5 |
| 2,497,771 | * | 2/1950 | Hirst ..................................... 254/131.5 |
| 2,520,606 | | 8/1950 | McLoughlin . |
| 2,769,612 | * | 11/1956 | Weisheit .............................. 254/131.5 |
| 2,846,785 | | 8/1958 | Underwood . |
| 3,035,816 | | 5/1962 | Conant . |
| 3,748,761 | | 7/1973 | Chetwynde . |
| 4,722,512 | * | 2/1988 | Lighthizer ............................... 294/59 |
| 4,881,332 | | 11/1989 | Evertsen . |
| 5,133,582 | | 7/1992 | Rocha . |
| 5,499,852 | * | 3/1996 | Seigendall ........................... 294/54.5 |
| 5,669,651 | | 9/1997 | Vroegindewey . |
| 5,732,933 | | 3/1998 | Champi . |
| 5,863,084 | | 1/1999 | Krug . |
| 5,918,921 | | 7/1999 | Samuelson . |

FOREIGN PATENT DOCUMENTS

| | | | |
|---|---|---|---|
| 1053224 | * | 3/1959 | (DE) ........................................ 294/59 |
| 1215811 | * | 4/1960 | (FR) ........................................ 294/59 |
| 659100 | * | 10/1951 | (GB) ................................... 254/131.5 |
| 1426-478 | * | 9/1988 | (SU) ........................................ 294/59 |

* cited by examiner

Primary Examiner—Dean J. Kramer
(74) Attorney, Agent, or Firm—Leonard Bloom (57) ABSTRACT

A shovel has a pan connected to an end handle by a shaft. A lever is attached to the shaft to assist in lifting a load. The lever has an L-shaped member and a portion of the L-shaped member is received in the bight portion of a spring. The lever preferably is resiliently attached to the shaft and returns automatically to a position adjacent to the shaft when the load on the shovel is emptied. A method of using the shovel is disclosed.

7 Claims, 8 Drawing Sheets

EASY LIFT LEVERED SHOVEL

FIELD OF THE INVENTION

The herein disclosed invention finds applicability where leveraged lifting is required. More specifically, the invention is directed to a modified hand shovel to be used mainly for snow removal.

BACKGROUND OF THE INVENTION

There is a continuing need and desire to produce lifting instruments which can lift heavy loads without placing undue physical strain on the person doing the lifting. This is particulary true of shoveling snow where many times elderly folk do the shoveling and place undue strain on their back as well as their heart. The shovel of this invention is designed to allow the user to shovel the snow without placing undue strain on the back or the heart.

The problem presented in shoveling snow is the raising of the snow to dump it. The snow has to be raised to about waist level. That is what puts a strain on the back. Once the snow is gotten to about waist level, it is relatively easy to sling the snow to one side for disposal.

OBJECTS OF THE INVENTION

In the normal manner of using a hand shovel, the operator is forced to assume an awkward and crouched position over the shank of the shovel and to grasp the shank of the shovel with one hand at the balance thereof and the other hand at or near the extremity thereof The operator then forces the blade of the shovel into the material, lifts the load on the blade, and flings the material to one side. The lifting of the load requires great physical effort and causes exertion to both the back and heart muscles and can cause back pain and heart attacks. This exertion can also cause hernias and general muscular pain. Accordingly, it is the general object of the present invention to provide an improved hand shovel that will lessen the strain on the muscles, back, and heart of the human operator.

PRIOR ART PATENTS

U.S. Pat. No. 4,881,332 discloses a shovel with a levered fulcrum, however the levered fulcrum is not automatically retractable.

Champi (U.S. Pat. No. 5,732,933) teaches a shovel with a fulcrum which is foot operated.

Krug (U.S. Pat. No. 5,863,084) teaches a shovel with a fulcrum to be placed against the thigh for leverage.

Vroegindewey (U.S. Pat. No. 5,669,651) shows a cambered foot-operated lever fulcrum for attachment to a shovel.

Rocha (U.S. Pat. No. 5,133,582) shows a two-handed shovel.

Samuelson (U.S. Pat. No. 5,98,921) shows a shovel with a fulcrum to be used to facilitate the lifting of a load.

McLoughlin (U.S. Pat. No. 2,520,606) teaches a two-handed, fulcrum-levered handle for attachment to a shovel to provide a means for easy lifting of a load. The shovel has a pair of wheels. The wheels are mounted on an axle attached to the ends of a fork. In turn, the fork arrangement is attached to the shovel. This fork arrangement functions as a fulcrum for the shovel.

Underwood (U.S. Pat. No. 2,846,785) discloses a wheeled side-dumping scoop, wherein a wheel assembly serving as a fulcrum is adjustably mounted on the shaft. The device has the capability of tilting the load to the side for load removal.

Chetwynde (U.S. Pat. No. 3,748,761) further discloses a supplementary wheeled carriage acting as a fulcrum to facilitate lifting the load on the blade of the shovel.

OBJECTS OF THE INVENTION

This invention has as its primary object producing a shovel which will be able to lift its load without placing undue physical stain on its user.

Another object of this invention is to produce a device for improving a shovel which can be retrofitted onto the handles of existing shovels.

A further object of this invention is to produce a shovel which is easy and safe to use while being able to lift heavy loads.

An important object of this invention is to produce a shovel which is able to lift heavy loads while both feet are on the ground rather than having one of the feet pressing on a lever to lift the load.

BRIEF SUMMARY OF THE INVENTION

The herein disclosed invention relates to shovels, and more particularly, to an attachment for a hand shovel that will enable it to be operated with considerably less strain and physical exertion.

In this invention, a shovel is provided with an adjustable levered fulcrum. The adjustable levered fulcrum is pivotally attached to a handle (shank) of the shovel at a place intermediate to the handle and the scoop. The levered fulcrum is resiliently biased and with the levered fulcrum having a use position and a resting position. The levered fulcrum is attached to the handle of the shovel with a hinge and the resilient bias is provided by a torsion spring.

The invention is directed to a shovel with a levered lift means which serves as a fulcrum so that heavy loads can be more easily lifted. Another significant feature of this invention is that the levered fulcrum means is fitted so as to be automatically retractable once the load is to be removed from the shovel.

DETAILED DESCRIPTION OF THE INVENTION

Figure 1:
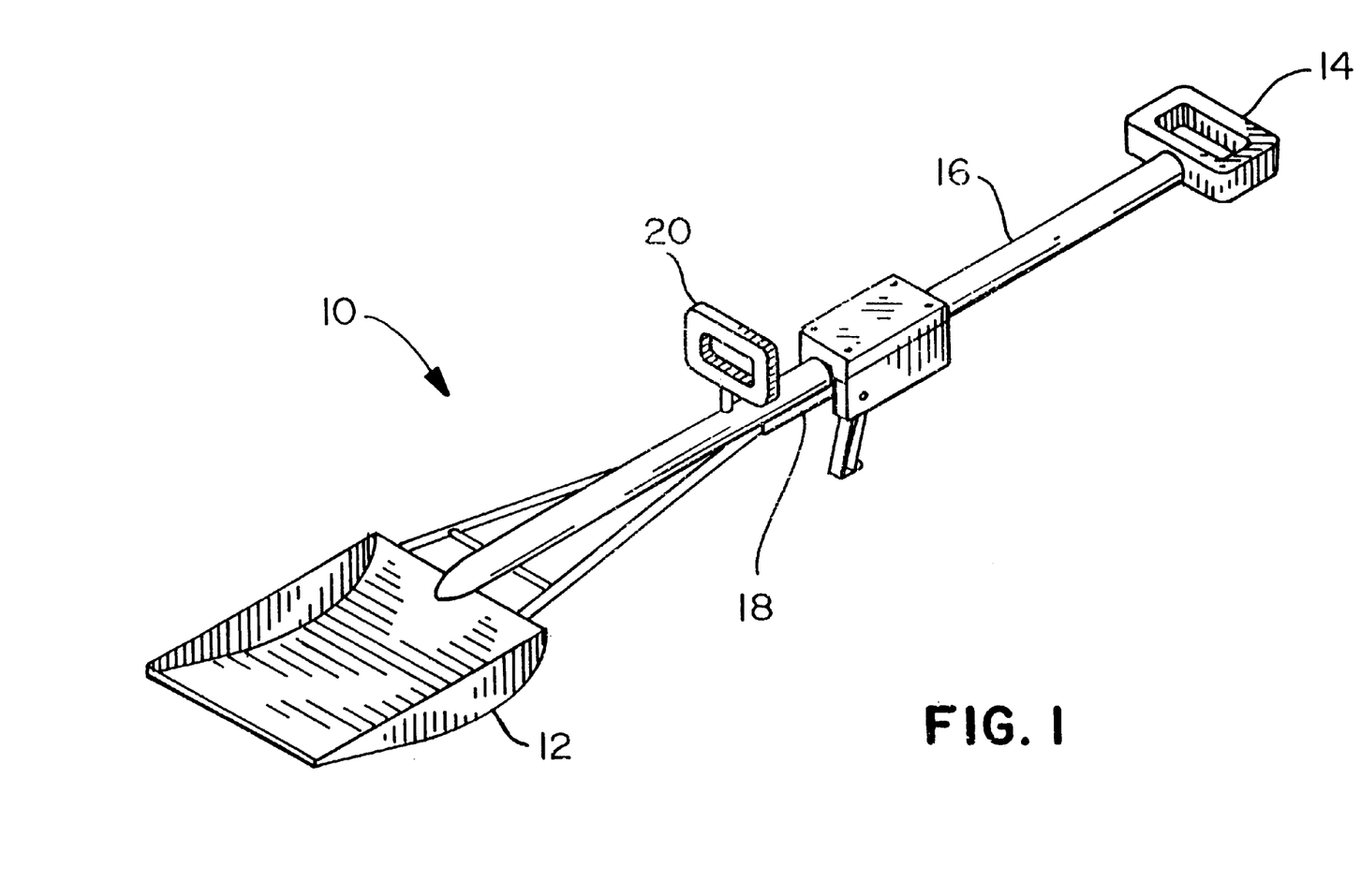
FIG. 1 is a perspective view illustrating the easy lift shovel of this invention.
Figure 2:
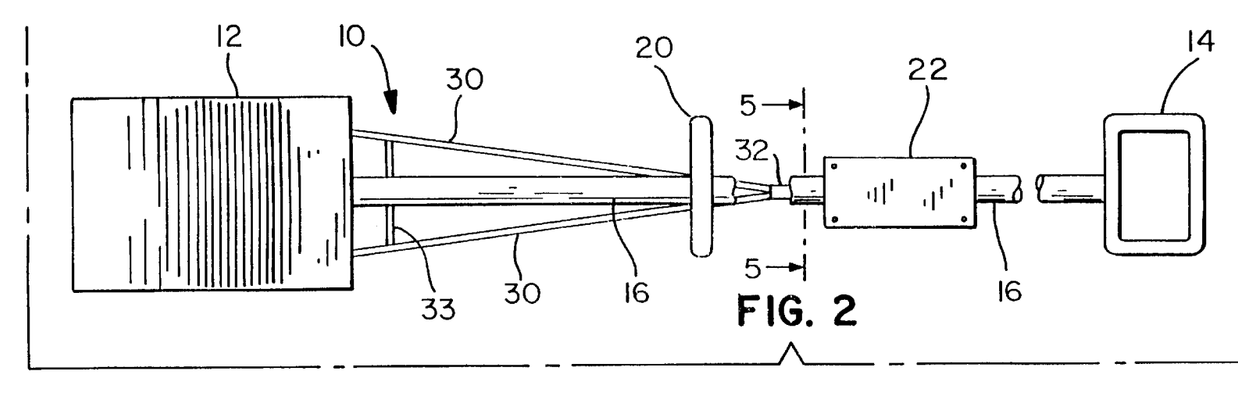
FIG. 2 is a top plan view thereof.
Figure 3:
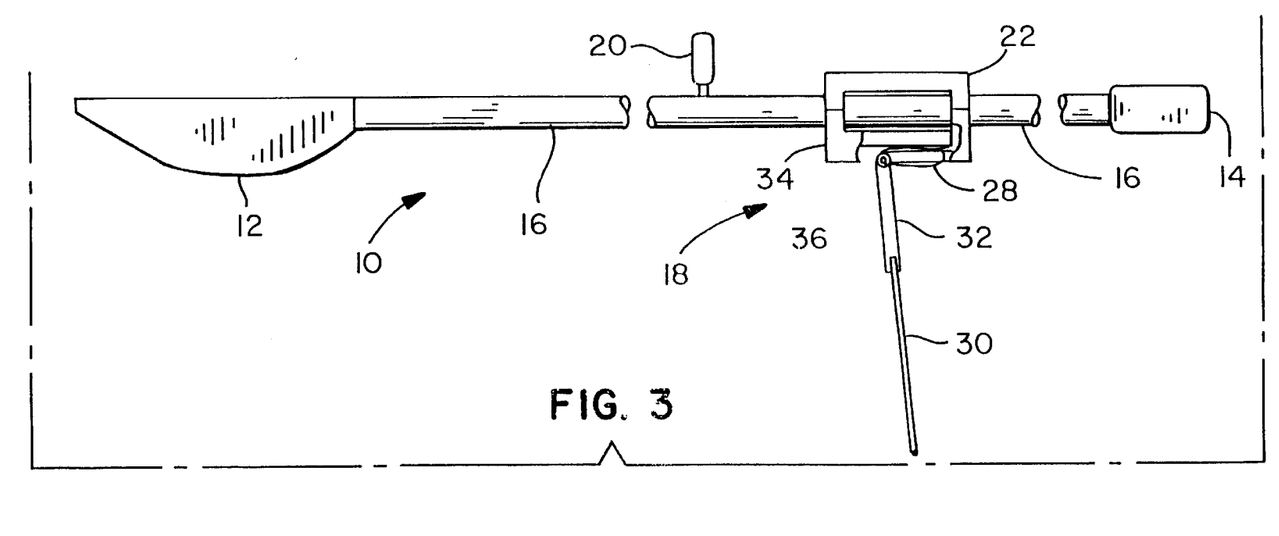
FIG. 3 is a side plan view thereof.

With reference to FIGS. 1–3, the easy-lift shovel of this invention 10 has a blade or pan 12 and a handle 14 and a connecting shaft (shank) 16 connecting the blade 12 to the handle 14. Intermediate blade 12 and handle 14 and pivotally attached to the connecting shaft is a levered fulcrum 18. In addition to handle 14, there is an auxiliary handle 20.

Figure 4:
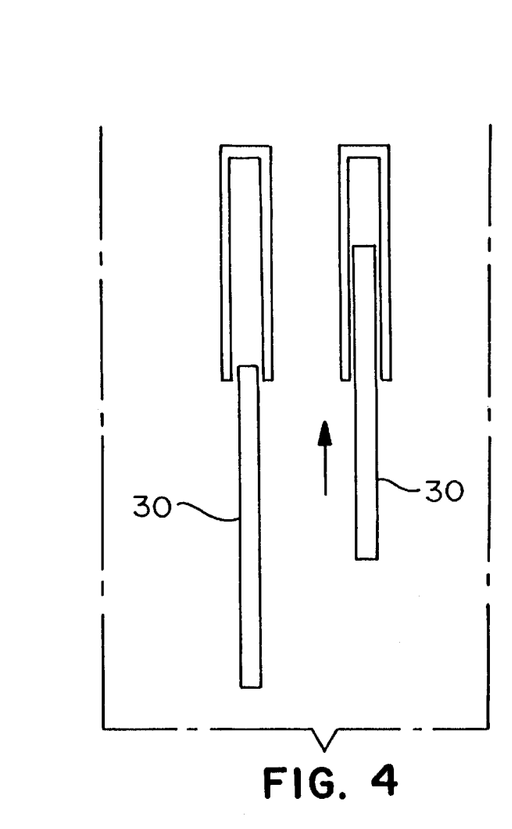
FIG. 4 are side plan views of the fulcrum leg of the easy lift shovel. The figure on the left shows the leg fully extended and the figure on the right depicts the leg partially retracted.

FIG. 4 is an enlarged view of the adjustable legs to the levered fulcrum 18. Preferably, the legs 30 are splayed with a cross support 33 to provide additional strength. The outer end portions of the legs preferably are capped with a non-slip tip 31 to reduce slippage on a surface Referring to FIG. 5, a movable clamp 22 for positioning the levered fulcrum 18 on the shaft 16 of the easy-lift shovel 10 is held in place with a nut and bolt arrangement 24. The means of movably securing the movable clamp 13 is not limited to a nut and bolt and may be any means known to persons skilled in the art.

Figure 5:
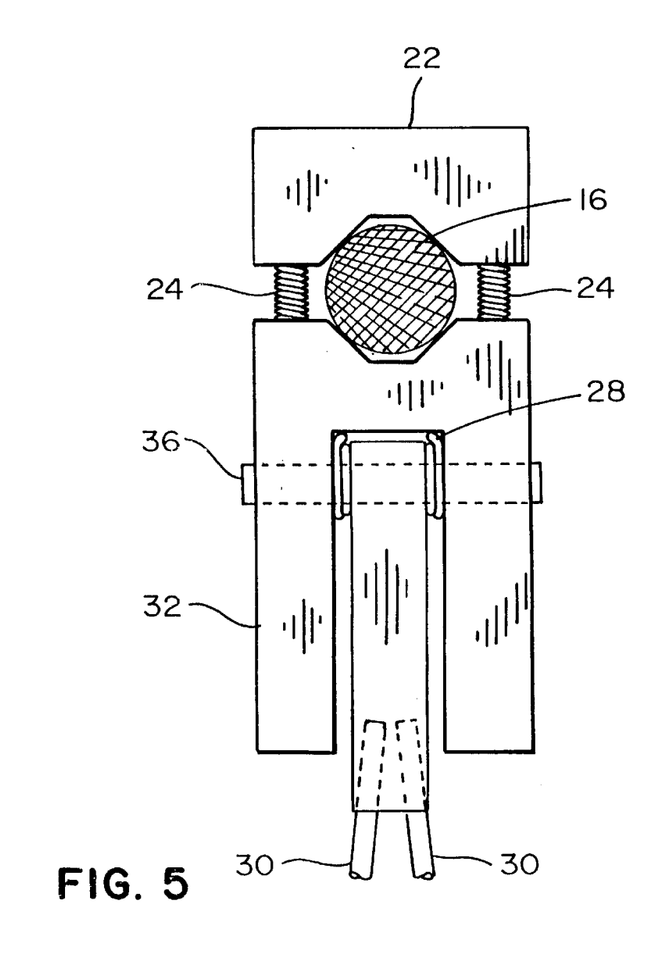
FIG. 5 is a cross-sectional view of the clamping device taken along lines 5—5 of FIG. 2.
Figure 6:
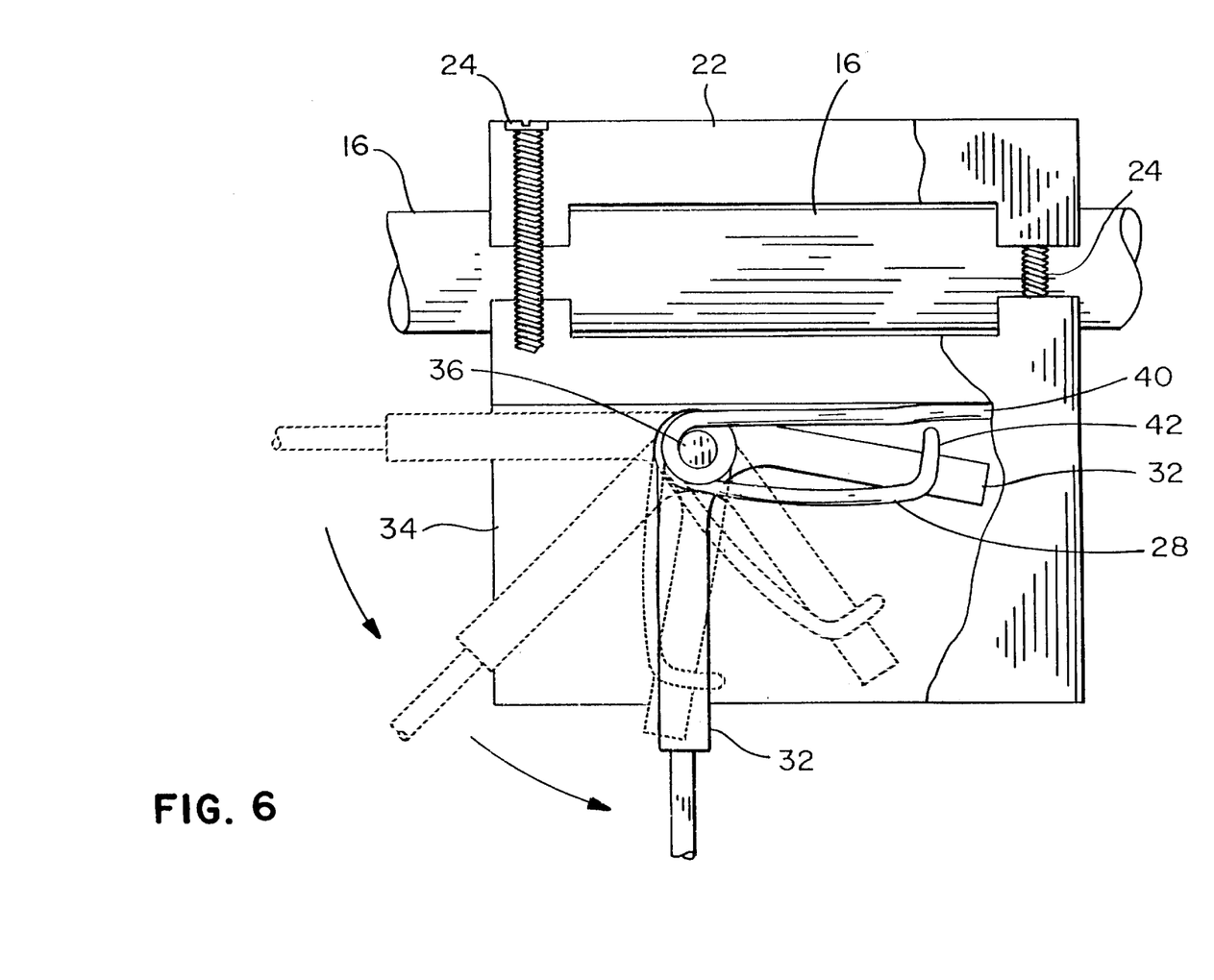
FIG. 6 is an enlarged partial cut-away side view of stop mechanism of the flexible fulcrum.
Figure 7:
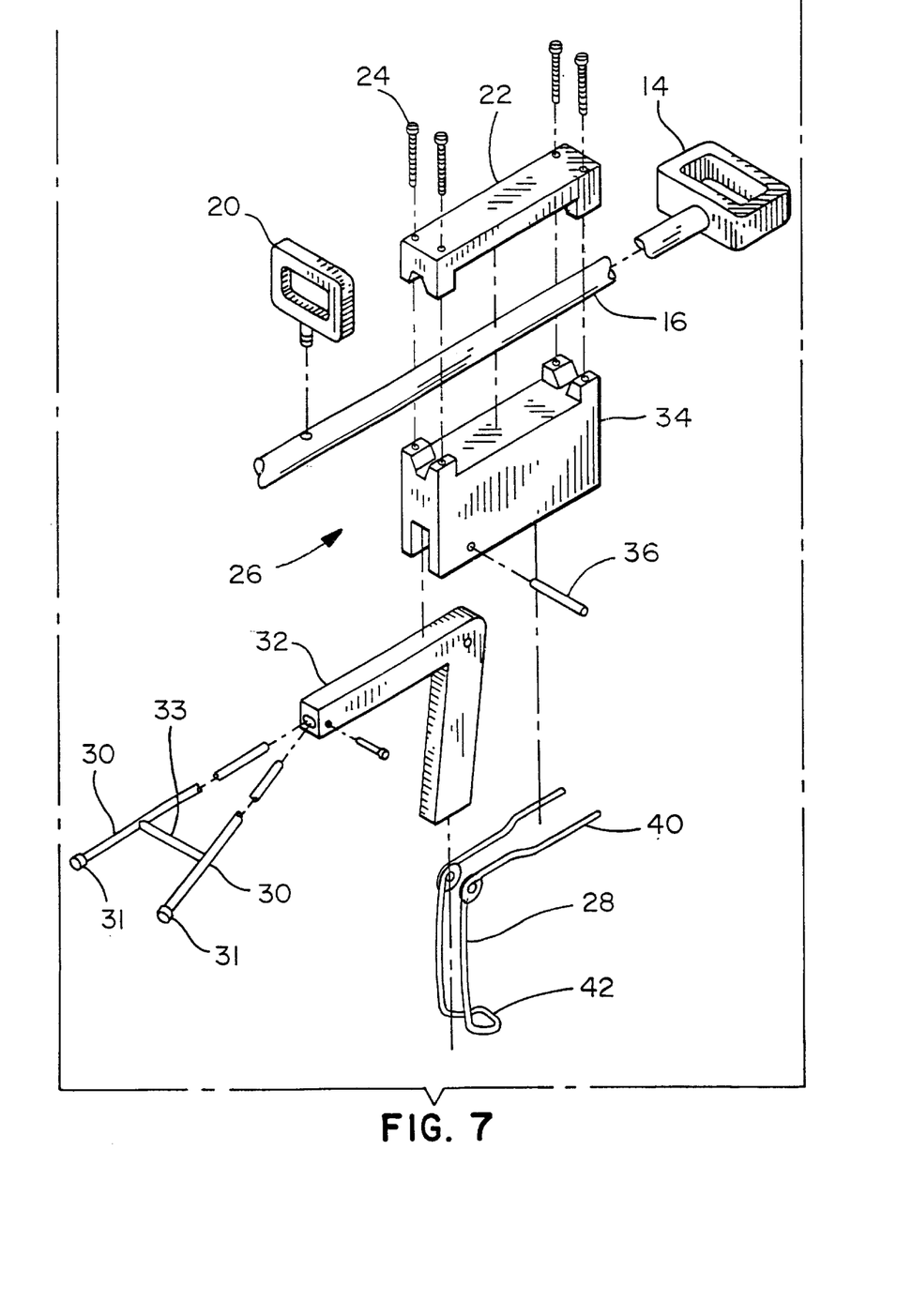
FIG. 7 is a view of the spring-loaded retraction mechanism.

As seen in FIGS. 5–7, the fulcrum positioning means 26 preferably has an L-shaped member 32 formed on the end of the levered fulcrum 18 opposite from the legs. The L-shaped member 32 is disposed in a cover 34 and retained therein by a pin 36 wherein the L-shaped member 32 is pivotably movable about the pin 36 within the cover 34. A spring 28 is coiled about the pin having ends 40 which bear against the cover 34. The spring 28 has a bight 42 in which the shorter leg of the L-shaped member 32 is received. In this manner, the levered fulcrum 18 is normally in a nested position below the shank 16. The operator pivots the lever against the resiliency of the spring 28 rearwardly away from the shank 16 and that the splayed legs 30 rest on the ground. After the operator loads the pan and raises the shovel, the spring 28 urges the lever back to the normal nested position. The cover 34 assists in protecting the operator's fingers from being pinched between the levered fulcrum 18 and the shank 16 when the lever 18 returns to its normal nested position.

Figure 8:
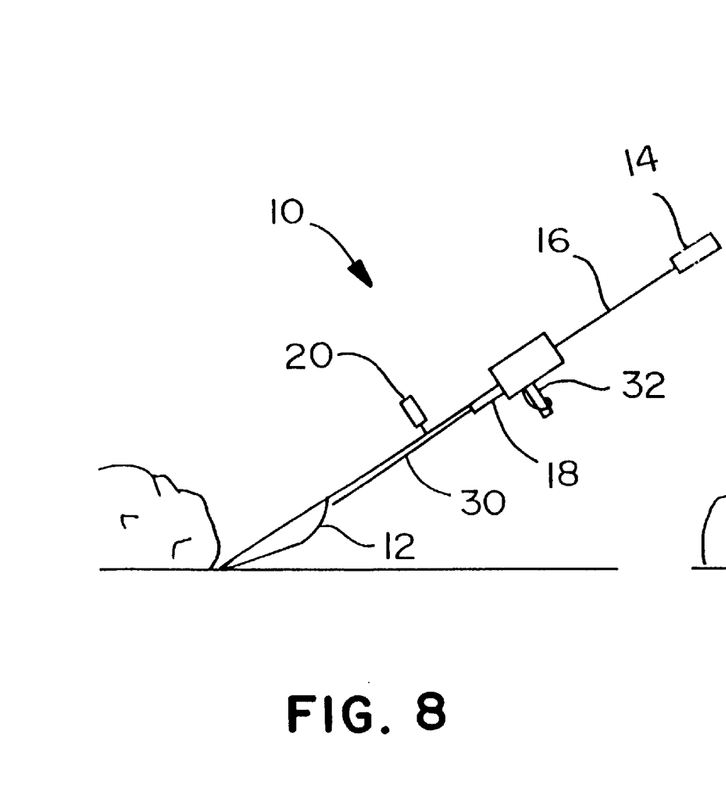
FIGS. 8–12 are views describing the use of the shovel as more fully described herein.
Figure 9:
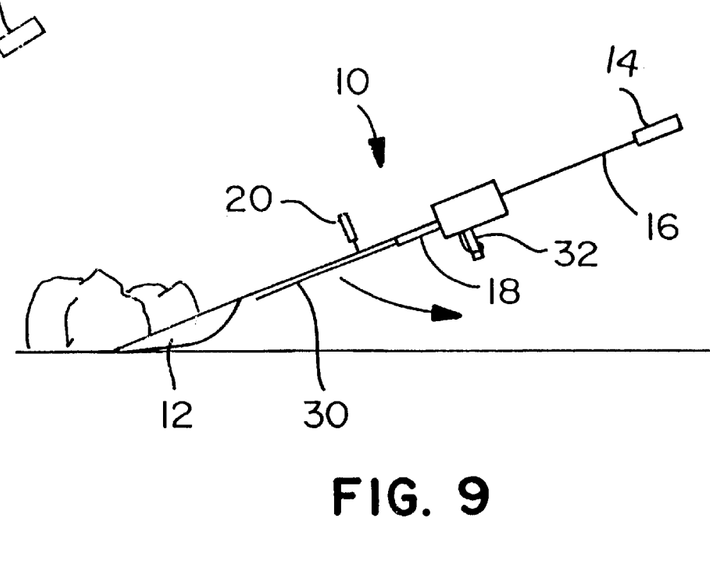

The method of use is shown in FIGS. 8–9 wherein the snow is loaded onto the blade 12 of the shovel 10.

Figure 10:
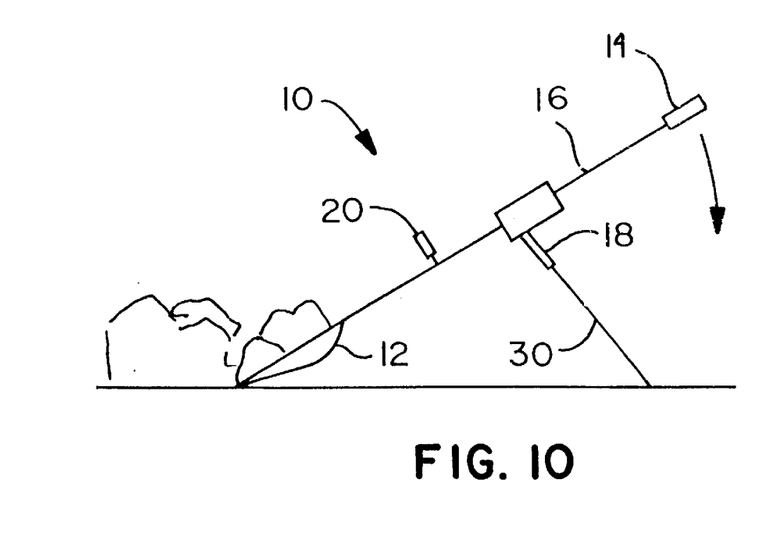

Next, the lever 18 is then pulled down against the resilient bias of the torsion spring 28 (FIG. 9) until the free end of the lever (the legs 30) rests on the ground (FIG. 10) so that the end of the lever forms a fulcrum.

Figure 11:
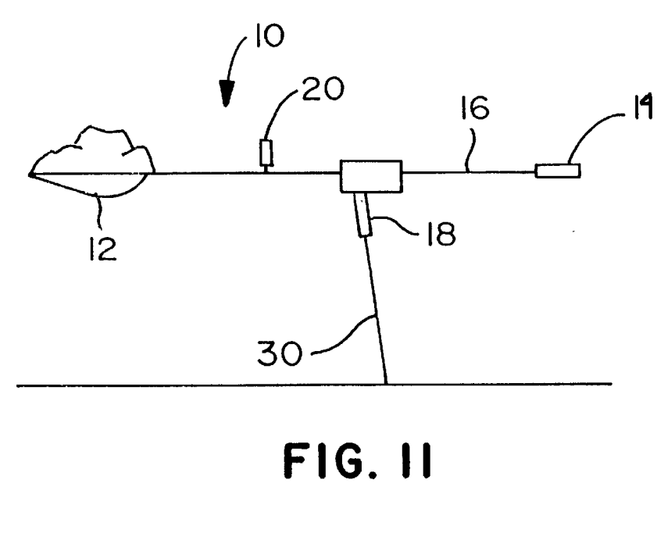

The main hand grip 14 on the end of the shank 16 is pushed down (FIG. 10) so that the snow on the blade 12 is raised (by the lever action) and so that the shovel 10 is about level (FIG. 11) with the ground.

Figure 12:
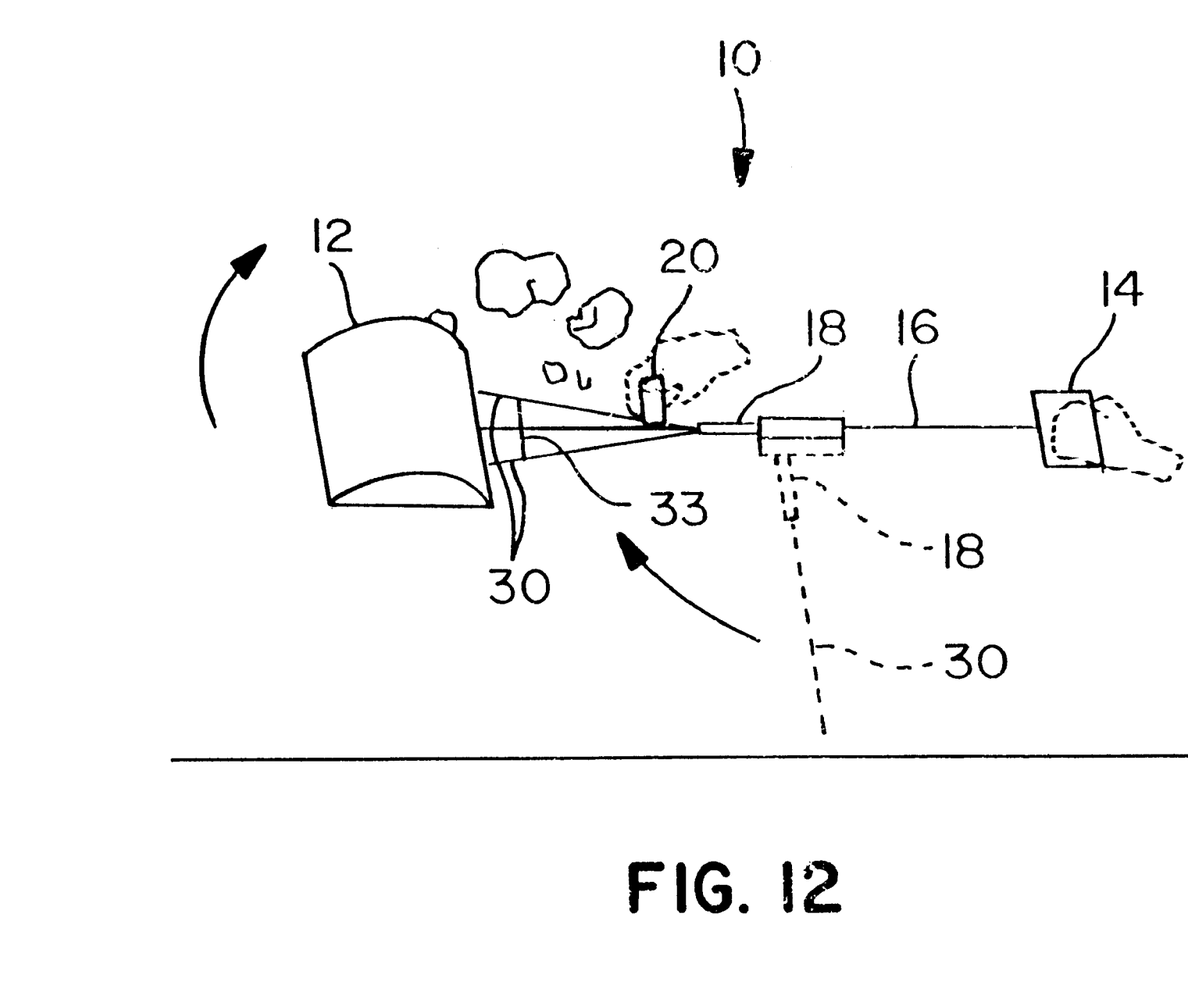

Finally, the operator grasps the auxiliary handle with his other hand, raises the shovel 10, and flings the snow to one side (FIG. 12).

When the operator so raises the shovel 10, the lever 18 (being spring-loaded) automatically returns to its normal (FIG. 8) position.

The auxiliary handle 20 is adjustable along the shank 16 of the shovel 10 to accommodate different operators. Also, the length of the lever 18 is adjustable to accommodate operators of different heights. The lever 18 may be telescoping with securing means to hold the lever at a selected length. The adjustable legs 30 may each be lengthened or shortened in one embodiment.

What is claimed is:

1. In combination with a shovel having a pan connected to an end handle by a shank, an auxiliary lifting mechanism comprising a lever having a pair of ends, the lever being pivotably mounted to the shank intermediately of the pan and end handle, and one end of the lever carrying a pair of splayed legs, wherein the lever has a normal position in which the lever is normally in a nested position below the shank of the shovel, and wherein the splayed legs have respective end portions normally received beneath the pan on the shovel, such that once the load is placed upon the pan of the shovel, the operator may manually pivot the lever rearwardly and away from the shank of the shovel, such that the respective end portions of the splayed legs rest upon the ground, and such that the operator may then push downwardly on the end handle of the shovel, thereby lifting the load on the pan of the shovel substantially to the waist level of the operator, and thereby enabling the operator to easily toss the load on the shovel to one side without incurring adverse strains on his or her body and further including a spring for resiliently biasing the lever to its normal nested position, such that as soon as the operator tosses the load on the pan of the shovel and thereby lifts the splayed legs off the ground, the lever automatically returns to its normal nested position beneath the shank of the shovel.

2. The combination of claim 1, further including an auxiliary handle adjustably mounted on the shank of the shovel between the pan and the end handle of the shovel.

3. The combination of claim 1, wherein the lever comprises an L-shaped member, the spring having a bight therein, a portion of the L-shaped member being received in the bight of the spring.

4. A levered shovel for easy lift and comprising a shovel having a shaft with a blade at one end and a handle at the other, wherein there is a spring actuated lever attached intermediately of the blade and the handle and nested under said shaft, the spring actuated lever being manually actuated to lower the lever to the ground, the spring actuated lever automatically returning to the nested position when the shovel is lifted and wherein there is an auxiliary handle attached approximately mid-point to the top side of said shaft.

5. The levered shovel of claim 4, wherein the lever comprises an L-shaped member, the spring having a bight therein, a portion of the L-shaped member being received in the bight in the spring.

6. A method of lifting an object from a ground surface comprising the steps of providing a shovel with a shaft having a handle and a blade at opposite ends of the shaft, inserting the blade of the shovel into said object to be lifted, providing a levered fulcrum having an L-shaped member and a spring with a bight therein, a portion of the L-shaped member being received in the bight in the spring, moving the spring actuated levered fulcrum which is hinged intermediately of the blade and the handle on the shaft of the shovel and laying parallel to the shaft, setting the levered fulcrum on the ground, and with downward pressure placed on the handle at the end of the shaft, lifting the load on the blade and slinging and discarding the load with minimal strain to the back.

7. A levered shovel for easy lift comprising a shaft with a blade attached to one end and a handle attached at an opposite end, a levered fulcrum connected to, and normally nested in a position adjacent to the shaft, the levered fulcrum having an L-shaped member and a spring with a bight, a portion of the L-shaped member being received in the bight, the fulcrum being manually actuated to support the shaft on the ground, wherein when a load is placed on the blade, the handle is pushed downwardly about the fulcrum to easily lift the load and the fulcrum automatically returning to the normally nested position.

* * * * *